United States Patent
Maa

Patent Number: 5,818,935
Date of Patent: Oct. 6, 1998

[54] INTERNET ENHANCED VIDEO SYSTEM

[76] Inventor: Chia-Yiu Maa, 16220 SW. Colleen Ct., Beaverton, Oreg. 97007

[21] Appl. No.: 814,286

[22] Filed: Mar. 10, 1997

[51] Int. Cl.[6] .............................. H04N 7/167; H04N 7/00
[52] U.S. Cl. .............................................. 380/20; 348/467
[58] Field of Search ...................... 380/20; 348/461–468

[56] References Cited

U.S. PATENT DOCUMENTS 5,617,565  4/1997  Augenbraun et al. .................. 395/604

OTHER PUBLICATIONS

URL at "http://wtv–star–1.artemis.com/corp/HTML/home.specs.html," WebTV, WebTV Networks, Inc., CA.
URL at "http://www.fcomm.net/cyberspider," CyberSpider, Inter–Con/PC, Inc., MN.
URL at "http://www.bocaresearch.com/press/111596a.htm," Set–Top Device, Boca Research, Inc., FL.
URL at "http://www.spyglass.com/whatwerein/cases/mcea.html," DiamondWeb TV, Mitsubishi Consumer Electronics America, GA.

Keith Jack, 1996, *Video Demystified—Chapter 5: NTSC/PAL Digital Encoding*, pp. 212–233.

ITU–R Recommendation BT.653–2: "System B, 625/50 television system," pp. 1994, pp. 279–305.

ETSI Draft ETS 300 472, 1996, "*Digital broadcasting systems for television, sound, and data services; Specification for Conveying ITU–R System B Teletext in Digital Video Broadcasting (DVB) bitstreams*," pp. 1–12.

*Primary Examiner*—Stephen C. Buczinski
*Attorney, Agent, or Firm*—Kolisch, Hartwell, Dickinson, McCormack & Heuser

[57] ABSTRACT

A system for accessing the Internet based on an Internet information pointer encoded in a video signal. The system includes a video display adapted to display a video portion of the video signal. The system also includes an Internet access device including a decoder adapted to extract the Internet information pointer encoded in the video signal, the access device being adapted to connect to the Internet to access the Internet based on the extracted Internet information pointer.

5 Claims, 3 Drawing Sheets

FIG. 1
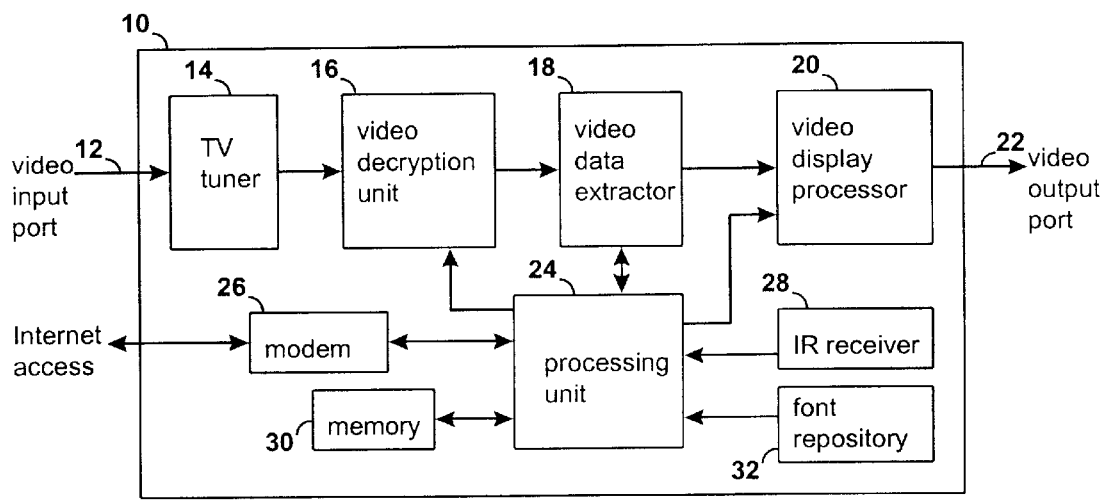
FIG. 2
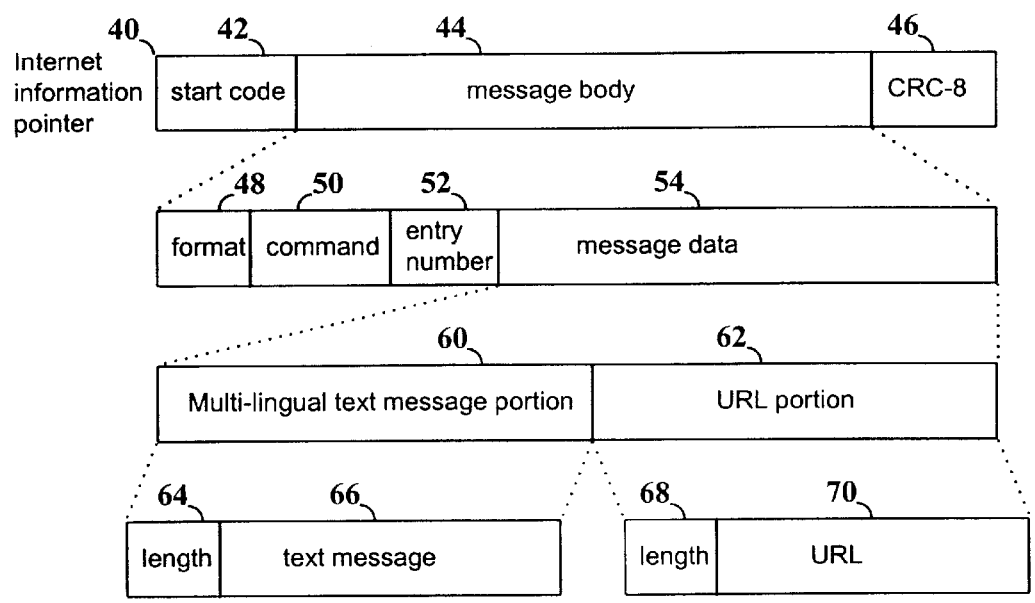
FIG. 3
| 0 | Default Home Page | http://www.netscape.com |
| 1 | ABC Network | http://www.abc.com |
| 2 | Meet the Sitcom Cast | http://www.sitcom.com |
| 3 | Nike Stuff | http://www.nike.com |
| 8 | KABC Information | http://www.kabc.com |

FIG. 4

```
Internet_information_pointer_encoding(){
    start_code(16);           /* write start code 0xfefe      */
    format(8);                /* write format codeword        */
    command(8);               /* write command codeword       */
    entry_number(8);          /* write entry number codeword  */
    if (isUpdate(command(8))){ /* if it is an update command  */
       text_message_length(8); /* write text message length   */
       text_message(text_message_length(8));
                              /* write text message           */
       URL_length(8);          /* write URL length            */
       URL(URL_length(8));     /* write URL                   */
    }
    CRC(8);                   /* compute and write 8-bit CRC  */
}
```

FIG. 5

```
Internet_information_pointer_decoding(){
    do {                       /* an infinite loop             */
       next_start_code();      /* find next start code         */
       format(8);              /* read format codeword         */
       command(8);             /* read command codeword        */
       entry_number(8);        /* read entry number codeword   */
       if (isUpdate(command(8))){/* if it is an update command*/
          text_message_length(8);/* read text message length   */
          text_message(text_message_length(8));
                              /* read text message             */
          URL_length(8);       /* read URL length              */
          URL(URL_length(8));  /* read URL                     */
       }
       CRC(8);                 /* read 8-bit CRC               */
       if(computeCRC()==CRC(8))/* if CRC match                 */
          execute_command();   /* modify the URL table         */
       else                    /* if CRCs don't match          */
          reset_all_fields();  /* reset all fields             */
    }
}
```

FIG. 6

```
next_start_code(){                   /* find the next start code */
    while(!insertPointAligned())     /* if not insert pt aligned */
       skip(8);                      /* skip one byte            */
    while(nextbits(16)!=0xfefe)      /* if not start code        */
       skipToNextInsertPoint();      /* skip to next insert pt   */
}
```

INTERNET ENHANCED VIDEO SYSTEM

FIELD OF THE INVENTION

The present invention relates to video systems and more particularly to a video system utilizing a video signal carrying embedded Internet access information.

BACKGROUND OF THE INVENTION

In many ways, the recent growth of the Internet has been driven by companies and organizations seeking to distribute information to the general public for political, commercial and other purposes. These companies and organizations have created many varied and interesting World-Wide Web (WWW or web) sites to make information available. Oftentimes, however, the greatest impediment to greater utilization of various web sites is that members of the public are unaware of the existence of, or the Internet address for, the sites. Recently, many of these companies and organizations have begun displaying their Internet addresses or universal resource locators (URL) on television or video advertisements and shows.

Unfortunately, at present, the television viewer must write down or remember the Internet address to be able to access the information contained there. For a viewer to go to a video program-related URL, the viewer must go to a computer, turn on the system, bring up a web browser, and in some instances, open separately an Internet connection to an Internet service provider (ISP), and finally type in the URL. The whole process is tedious and not very attractive to the average TV viewer.

With the introduction of the first-generation web TVs, the situation has improved somewhat. A web TV is a new breed of consumer electronics products that converges the functions of a TV set and a WWW browser into one system, often referred to as the set-top box (STB) because initial implementation of these systems is a box that sits on top of a TV set and uses the display of the TV. It is foreseeable that in the future the functionality of a web TV STB will be incorporated directly in TV sets. For the sake of discussion, we will refer to existing systems that converge the functions of TV viewing and web browsing as web TV STBs.

There are presently a number of different web TV STBs available on the market. In general, the existing web TV STBs operate as follows:

(1) A user selects TV viewing or web browsing by pressing a button on a remote control.

(2) If TV viewing is selected, the remote control operates the same way as that of a standard TV set. A TV tuner module inside of the web TV STB provides the capability of TV channel switching.

(3) If web browsing is selected, the web TV STB initializes the web browser software and connects via a modem to a default URL through an Internet service provider (ISP). Once connected to the default URL, a user uses a remote keyboard and a pointing device, just like a PC keyboard and a mouse, for navigating through the web contents. The web contents could be either hypertext markup language (HTML) documents or personal E-mails, among other things.

Existing web TV STBs allow a user to choose either TV viewing or web browsing, but not both at the same time. Furthermore, there is no interaction between the operations of TV viewing and web browsing.

From the viewpoint of a user, the advantage of using a web TV STB is that one does not have to go back to his or her computer in order to bring up a web browser and connect it to a default URL through an Internet service provider (ISP). All these steps are accomplished by the web TV STB behind the scene.

A limitation of the existing web TV STBs is that when a user elects to access a URL displayed at the end of a TV program or commercial, they still have to remember the URL, change the web TV STB to web browsing mode and then type in the URL via a remote keyboard. The typing is error-prone, and the fact that one has to remember a URL before web browsing makes it impractical to use for TV viewers who lack basic Internet knowledge. For non-English speaking audience, web TV STBs are almost impossible to use since URL is encoded in ASCII character set, a character set designed for English speakers.

In summary, existing web TV STBs are not able to interact the video contents and the web contents because of the fact that the video signal sent to a TV set is fairly dumb. Note that the term "video contents" is used to reflect that the origination of a video signal is not limited to broadcast (satellite or cable) TV feed and further that a video signal can originate from an on-demand video feed, a VCR tape and other video storage medium such as laser disk and digital video disk. The fact that video signals used in the consumer market do not carry any explicit data information pertinent to web contents makes it impossible for any interaction to be conducted.

It is therefore an object of the present invention to provide a system that allows a user to access URLs related to video programming without having to memorize or record the URL.

Another object of the present invention is to provide a system for accessing the Internet that is usable by non-English speaking people.

One more object of the present invention is to provide a system that allows video program producers to encode a URL into the video signal that can be used to direct a viewer to a desired Internet site without requiring the viewer to type in the URL.

Yet another object of the present invention is to bridge the operation of TV viewing and web browsing and thus provide a form of interaction among the video contents and the web contents.

SUMMARY OF THE INVENTION

A new Internet access device and system is devised to address those limitations and restrictions of the existing web TV STBs. Two interactions of the video contents and the web contents are demonstrated with the devised web TV STB. One interaction demonstration bridges the transition from video viewing to a video content related URL via a multilingual, user-friendly interface, and the other demonstration makes use of a web connection to obtain a decryption key for decrypting encrypted pay-per-view video or data services in an integrated, secure and on-demand fashion.

To enable interaction between the web contents and the video contents, a method is first devised to format URL-related information into what are called Internet information pointers, and then an apparatus is devised to encode those Internet information pointers into a text-data transport portion of a video signal.

For every video program-related URL, the Internet information pointer encoding method encodes mainly two things: a multilingual reference referred to as a text message and a URL. The Internet information pointer encoding method also includes in every Internet information pointer a command for instructing the Internet information pointer decoding apparatus, residing in the devised Internet access device, how to maintain and update its internal table of text messages and URLs.

The Internet information pointer encoder is a generic apparatus for encoding Internet access information onto a data transport portion of a video signal. The Internet information pointer encoder includes an Internet information pointer authoring unit and a video data inserter. The Internet information pointer authoring unit employs the devised Internet information pointer encoding method for creation of an Internet information pointer. The video data inserter dubs an Internet information pointer onto a text-data transport portion of a video signal. For NTSC and PAL analog video format, the Internet information pointers are encoded into one of the caption text channels. For these two video formats, two preferred embodiments of the Internet information pointer encoder are devised, where one embodiment uses the multilingual UNICODE character set to encode the text message, and the other uses the ASCII character set to encode the text message. The former embodiment has the advantage of providing multilingual text messages to users, and the latter has the advantage of leveraging existing ASCII-based closed-captioning hardware and software available in the U.S. market. For the PAL analog video format that supports teletext, an embodiment of the Internet information pointer encoder is devised to encode the Internet information pointers into a designated teletext page, in the same way that the caption text is mapped into a designated teletext page. For the European digital video broadcasting (DVB) format, an embodiment of the Internet information pointer encoder similar to the one used for the PAL teletext system is devised. Such an embodiment is straightforward because the means to use an MPEG-2 data stream for transporting teletext data has been standardized. For the U.S. digital television format, an embodiment of the Internet information pointer is devised to encode the Internet information pointers into the text-based ancillary services portion of the video stream. The text-based ancillary services have been assigned for transporting the television program subtitles and they are completely analogous to the NTSC closed-caption format.

To summarize, the devised Internet access device overcomes the restrictions and limitations of the existing web TV STB in several ways. First, it provides interaction between the video signal and the web contents. In particular, by dubbing URL information onto a video signal, the devised Internet access device facilitates the transition from video viewing to a video content-related URL for web browsing. Second, an easy-to-use user interface is provided by superimposing the text message menu on a TV screen and using a simple push-button mechanism for selecting a text message menu item, and subsequently a URL. Last, the difficulty of accessing the Internet with existing web TV STB for users who are Internet-illiterate, non-English speaking, or both is greatly reduced by using multilingual references and multiple-language fonts and automated URL entry.

BRIEF DESCRIPTION OF THE DRAWING

FIG. 1 is a block diagram of a TV-based device for accessing the Internet according to the present invention.

FIG. 2 is a structural description of the Internet information pointer.

FIG. 3 is a table of Internet access pointers according to the present invention.

FIG. 4 is the Internet information pointer encoding method of the present invention.

FIG. 5 is the Internet information pointer decoding method of the present invention.

FIG. 6 is the next_start_code( ) function of the Internet information pointer decoding method of the present invention.

DESCRIPTION OF THE PREFERRED EMBODIMENT

Figure 7:
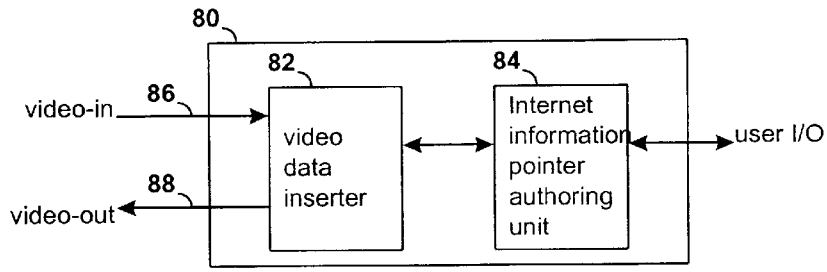
FIG. 7 is a block diagram of an Internet information pointer encoder apparatus of the present invention.

A TV-based Internet access device configured to use an Internet information pointer encoded in a video signal is shown generally at 10 in FIG. 1. In the preferred embodiment, device 10 includes an RF video signal input port 12 which connects to a TV tuner 14 which extracts the video signal from the RF carrier. The video signal output from the tuner is fed into a video decryption unit 16 which carries out any decryption necessary to convert the video signal into standard format. The decrypted video signal then passes through a video data extractor 18 which strips, decodes or extracts the Internet information pointer from the video signal, and possibly other teletext data. Upon leaving the video data extractor, the video signal passes through a video display processor 20 in which text or other information may be added to or substituted for the video signal, as described below. After processing by the video display processor, the video signal passes out of a video output port 22 and then to a standard TV for display.

The Internet access capabilities of device 10 are supported by a processing unit 24 which uses a modem 26 as an Internet access port. It should be understood that any other type of Internet communications device could be used in place of modem 26. Processing unit 24 is controlled by a user through a user input port in the form of an infrared (IR) receiver 28, and accesses a memory module 30 and a font repository 32. The IR receiver accepts user input from a remote control and a remote keyboard and possibly a remote pointing device. The font repository is a replaceable device that stores fonts for multiple languages. These fonts are used by the video display processor for displaying text on the TV screen in the language of the user's choice. The memory module is a generic storage unit for an operating system, application software and data. Processing unit 24 is preferably configured to run a web browser or similar software to allow a user to interactively access the Internet.

It should be noted that the device of the present invention is preferably embodied in a set-top-box or STB that can be attached to a TV or VCR as per existing web-TV STBs. This arrangement allows the device to be used with existing video equipment. However, it is also possible to incorporate the device of the present invention directly into a TV or VCR.

When the web browser is active, the processing unit generates a video signal representing the activities of the web browser. This web video signal is fed into the video display processor and substituted for the video signal coming in from the video data extractor. Thus, the viewer or user is able to toggle back and forth between TV viewing and web browsing. This toggling is preferably controlled by the user through the IR receiver. In addition, the present invention does not preclude the possible operation of the web browsing and the TV viewing at the same time. For example, the video display processor can be implemented such that it can reduce the display size of the video program content to the 75% of the TV screen, and leave the unused screen area for the browser to display other contents, such as a stock ticker or news headlines scrolling across the bottom of the screen. It would also be possible to have information related to Internet sites scrolling across the screen. This is possible since both the web browser and the Internet information pointer processing program are running on the processing unit hardware.

The stock, headline or other information displayed by the web browser in parallel to a TV program can be broadcast along with the video data and extracted by the video data extractor to the processing unit, which in turn feeds the stock ticker data to the web browser. Alternatively, the information may be fetched by the web browser directly via an Internet connection. Either way, a pertinent Internet information pointer can be provided with the information so that when, for instance, the stock ticker is available on the screen area controlled by the web browser, a user can choose to bring up a full-screen web browsing to a pertinent web site for detail on-line information on the stock market.

An Internet information pointer according to the preferred embodiment for use with the present invention is depicted at 40 in FIG. 2. Pointer 40 includes three parts: a start code 42, a message body 44 and an error correction portion in the form of an 8-bit CRC code 46. The start code provides a signal that can be identified, as will be described in more detail below, to locate the beginning of a pointer. The CRC code allows verification that no errors have occurred in transmission or decoding of the pointer.

The remainder of the pointer is occupied by the message body, which includes a format code or specifier 47, a command code 48, an entry number 50 and a message data section 52. The format specifier is used to indicate the encoding format of any subsequent text portions of the message body. The different formats allow the text portions of the message to be encoded in various languages, including those with non-arabic characters. Examples of possible formats would include UNICODE (ISO10646-2), ex-CCITT T.101, People's Republic of China character set (GB 2312), Korean Standard character set (KSC 5601-1987), Japanese Industrial Standard character set (JIS C 6226) and ASCII code.

The command code informs the device what to do with the received pointer. The four commands used in the preferred embodiment are delete, reset, test and update. Of these commands, only the update requires the message data portion. The entry number correlates with the command code to tell the device which entry to apply the command to, as will be described in more detail below.

The message data section has a multilingual text message portion 60 and a URL portion 62. The text message portion begins with a length code 64 and a text message 66 with a length corresponding to the length code encoded in the format specified by the format code. The URL portion likewise consists of a length code 68 and a URL 70 with a length corresponding to the length code. The URL will typically be encoded in ASCII because this is the standard format for Internet addresses.

It should be noted that the above-described structure for the Internet information pointer is in no way required for implementation of the present invention. For instance, it would be possible to simply encode a WWW page address or other Internet resource information in ASCII as the pointer with no additional format or text information. Of course, the described arrangement provides a number of advantages in terms of functional capabilities and multilingual use and is therefore preferred.

In operation, as the video signal comes in, the video data extractor will periodically extract pointers from the video signal and pass them up to a pointer processing program running on the processing unit. The processing unit generates a table of Internet pointers based on the commands encoded in the video signal, such as shown in FIG. 3. This table would probably be regenerated each time the device is activated or the channel is changed. For instance, the video signal when the device is activated might be a Nike™ commercial playing during an ABC™ sitcom broadcast from a local station, KABC. The video signal from the local station would likely be periodically encoded with Internet pointers for ABC™ and the local station, KABC. The text message for the ABC™-related pointer might be "ABC Network," with a corresponding URL of www.abc.com. The local station text message could be "KABC Information" with a URL of www.kabc.com. During the sitcom, the video signal would be periodically encoded with a pointer for the sitcom, e.g., a text message of "Meet the Sitcom Cast" and a URL of www.sitcom.com. Similarly, during the commercial, the video signal would be encoded with a pointer for Nike™, e.g., a text message of "Nike Stuff" and a URL of www.nike.com.

The pointers are encoded repeatedly/periodically to allow for viewers who change the channel or for times when a particular instance of a pointer might not have been received due to poor or intermittent reception. Although in the example described only one pointer was used for each entity, multiple pointers could be used for each entity as well. For instance, the broadcast station KABC might provide a separate pointer for a weather site and a programming schedule site.

The processing unit maintains the table according to the commands contained in the pointers in the video signal. Then, when the viewer wants to access some related Internet site, the viewer can push a button on a remote control to display the table for selection. This will cause the processing unit to feed the table information to the video display processor for superimposition onto the video signal for display on the television monitor. Thus, the video display processor is capable of: (1) displaying only the video from the video extractor, (2) superimposing on that video with a two-dimensional menu of text messages from the processing unit, or (3) displaying only the contents of the web browser software running on the processing unit.

Thus, there are two main software applications—a web browser and a pointer processing program—executing in an operating system running on the processor. The pointer processing program maintains the above-described internal table. It updates its internal table by executing the pointer messages received from the video data extractor. The pointer processing program is also responsible for piping the text messages from the table to the video display processor to be superimposed on the TV screen. In the TV viewing mode, the device provides the user with the option of whether to display the text message menu on the screen.

When a user activates the text message menu option by pressing a button on a remote control, the video display processor displays on the TV screen a menu item for each non-empty entry of the URL and text message table maintained by the Internet information pointer processing program. Each menu item comprises an entry number and a text message. The presentation of the entry number and the text message is based upon the font available in the font repository. A default font library is available in the memory module for ASCII character set. All menu items stack up to form a two-dimensional menu on the TV screen. A user can select any of the displayed text message by pressing the pertinent entry number to a remote control. Once this occurs, the operating system on the processing unit will initialize the web browser to the URL pertinent to the selected text message. A memory sharing mechanism is used by the operating system and the Internet information pointer processing program to exchange the content of the URL and text message table.

Another feature of the present invention is that the web browser can use a secured Internet connection for obtaining a decryption key for an encrypted video program or a video data service channel. When a user wants to view an encrypted, pay-per-view video channel or a subscription-based video data service, he or she needs to connect to the web browser (running on the processing unit) to a URL to purchase a decryption key. By transporting Internet information pointers inside a TV program guide channel, the devised web TV STB of the present invention can display for each TV channel a text message pertinent to the default URL of that TV channel. The user can thus use the same push-button interface to connect the web browser to purchase a decryption key. The purchased decryption key will be forwarded by the operation system on the processing unit to the video decryption unit. The web browser on the processing unit also maintains a decryption key file for all reusable keys, since the decryption key is often reusable for subscription-based video data services.

One advantage of the present system is that the decryption key can be "intelligent" in that it can include control field that contains an expiration date, personal information—such as viewing restrictions for children, or a renewal policy, among other things.

For the Internet access device of the present invention, the advantages of using a web browser to obtain decryption keys for pay-per-view video signal decrypting and subscription-based data services decryption include the following.

(1) By transporting Internet information pointers pertinent to every TV channel inside a TV program guide channel, the device can use the same simple push-button user interface for text message selection for initializing the web browser on the processing unit to a URL pertinent to a TV channel, and thus remove once again the need for a user to type in URL information.

(2) The delivery of the decryption key can be made highly secure by using encrypted Internet connection.

(3) The decryption key needs not to be fixed and can be changed up to the minute and be delivered to the user on-demand. This greatly enhances the security.

(4) The obtaining and delivery of the decryption key is handled by an integrated unit, namely, the device of the present invention, so the user does not need to make a separate phone call for a decryption key and to type in manually the key to a decryption unit, and in fact, the user never needs to know the value of a decryption key.

(5) The decryption processing module can be highly simplified and manufactured more cost-effectively as the means of obtaining a timely decryption key in a secure fashion is provided elsewhere.

(6) A file of reusable decryption keys minimizes the need of making unnecessary Internet connections for obtaining decryption keys that do not change frequently. Moreover, the decryption key can now use syntax similar to those used by the HTTP cookies (URL at http://home.netscape.com/newsref/std/cookie_spec.html", *Persistent Client State—HTTP Cookies*, incorporated herein by reference) so that a decryption key can be made to be highly personal, available on-demand, and timestampable, i.e., it is possible to assign an expiration date for the decryption key.

Internet Information Pointer Encoding Method

The Internet Information pointer format described above defines the syntax of an Internet information pointer. An Internet information pointer encoding routine according to the present invention is shown in FIG. 4 in pseudo C code. The method starts out by writing out a start code that indicates the beginning of an Internet information pointer. The start_code(16) function denotes that the start code is a codeword of 16 bits and the comment portion says that the start code is of value 0xfefe (in hexadecimal). The codeword for the format is written next by the format(8) function. It is preferred that the format codeword come before other fields of an Internet information pointer body because the value of the format codeword dictates how the rest of the fields are to be interpreted. The pointer encoding method writes out next the command codeword and the entry number codeword through the functions command(8) and entry_number (8), respectively.

After the command and the entry number get written out, there is a check on the command type. The isUpdate (command(8)) function returns true if the command is an update command and false otherwise. For an update command, a text message length, a text message, a URL length and a URL in ASCII are written out sequentially by the corresponding functions in FIG. 4. The text_message_length(8) and URL_length(8) functions write out the values of the text message length and the URL length as one-byte unsigned integers. Finally, a CRC(8) function computes an 8-bit CRC codeword of the Internet information pointer body and appends the computed CRC codeword at the end of the Internet information pointer.

Note that the Internet information pointer encoder apparatus that makes use of the above Internet information pointer encoding method is responsible for identifying an appropriate point in the text-data transport portion of a video signal for inserting an Internet information pointer. Taking NTSC video format as an example, an appropriate insert point would be the beginning of a closed-caption text row. It is also the responsibility of the Internet information pointer encoder apparatus to lay out an Internet information pointer properly onto the text-data transport portion of a video signal. The Internet information pointer encoder apparatus will be described in greater detail below.

Internet Information Pointer Decoding Method

The counterpart of an Internet information pointer encoding method is an Internet information pointer decoding method. An Internet information pointer decoding routine according to the present invention is shown in FIG. 5 in pseudo C code. The highest level of the code procedure is an infinite do-loop because monitoring the video signal for Internet information pointers is preferably a continuous process. Inside the do loop, the first function is the next_start_code( ) function. This function scans the text-data transport portion of a video signal for the identification of the beginning of a valid Internet information pointer. The detail of this function is shown in FIG. 6 in pseudo C code.

The next_start_code( ) function starts out by aligning its search point to the next appropriate insert point for an Internet information pointer. This is achieved by the first while-loop in the code procedure. In the case of an NTSC video signal, the insertPointAligned( ) function looks into a closed-caption channel to see if the beginning of a closed-caption text row is encountered. If not, skip one byte and continue. If an insert point is identified, the next_start_code( ) function goes on to verify whether the first two bytes of the incoming data from the text-data transport portion of a video signal match the codeword of a start code. The nextbits(16) function reads the next two bytes from the text-data transport portion of a video signal. If a match is found, the second while-loop of the next_start_code( ) function terminates and the thread of process returns to the do-loop of the pointer decoding code procedure in FIG. 5; otherwise, the skipToNextInsertPoint( ) function skips the rest of the incoming data bytes of the text-data transport portion of a video signal to the next valid insert point for an Internet information pointer.

When the next_start_code( ) function in FIG. 5 returns, the codeword of a start code of an Internet information pointer is found and read. The Internet information pointer decoding method continues by reading in an 8-bit format codeword, an 8-bit command codeword, and a 8-bit entry number codeword. A command type check is then performed. For an update command, a one-byte text message length is first read, and then according to the value of the text message length, the corresponding number of bytes are read to be the text message. Following this, a one-byte URL length is read, and then according to the value of the URL length a number of bytes are read to be the URL. The last byte read in for an Internet information pointer is an 8-bit CRC codeword by the CRC(8) function. The computeCRC( ) function computes a CRC codeword for the newly received Internet information pointer body. The computed CRC codeword is compared to the received CRC codeword. If these two CRC codewords match, the command of the received Internet information pointer is executed and the processing unit modifies its internal URL and text message table accordingly. If the two CRC codewords do not match, the newly received Internet information pointer is discarded and all the parameters of the Internet information pointer decoding method are reset.

Generic Internet Information Pointer Encoder and Decoder Apparatuses

Depending on the video signal format and the way an Internet information pointer is mapped onto a text-data transport portion of a video signal, there are many possible embodiments of an Internet information pointer encoder and each such embodiment dictates a matching embodiment of an Internet information pointer decoder. In practice, it is possible to merge several Internet information pointer decoders into a single hardware embodiment and to use software for reconfiguring such hardware to match different Internet information pointer encoders.

Referring to FIG. 7, a generic Internet information pointer encoder apparatus 80 includes a video data inserter 82 and an Internet information pointer authoring unit 84. The video source to be dubbed with Internet information pointers is fed into a video-in port 86 of the video data inserter and the resultant video is outputted through a video-out port 88. The video data inserter is also capable of stripping off existing Internet information pointers from its input video signal.

The Internet information pointer authoring unit employs the above described Internet information pointer encoding method and also provides a user interface for authoring Internet information pointers. The video data inserter and the Internet information pointer authoring unit coordinate in dubbing an Internet information pointer onto a text-data transport portion of the input video signal. They also coordinate to break a long Internet information pointer into smaller packets in order to fit in the data packet boundary of the underlying video signal. An example of a data packet is a closed-caption text row which can hold a maximum of 32 bytes.

As mentioned above, the Internet information pointer authoring unit preferably repeatedly dubs the same Internet information pointer onto the video signal in order to cope with the problem of TV channel switching. An automatic reset is induced of the URL and text message table that is maintained by the Internet information pointer decoder of the Internet access device. A periodical delivery of relevant Internet information pointers assures the Internet information pointer decoder will obtain sooner or later a complete copy of all the relevant Internet information pointers. A periodic delivery mechanism also inherently solves the problem caused by video data transmit error.

Though the Internet information pointer encoder can be implemented as a standalone system, it is most likely embodied in a personal computer system in which the video data inserter is implemented as a PC add-on card and the Internet information pointer authoring unit becomes a software application running on that PC. As mentioned earlier, depending on the video signal format and the way an Internet information pointer being mapped onto a text-data transport portion of a video signal, there can be different embodiments of the generic Internet information pointer encoder. Special requirements for these different embodiments will be described below.

Figure 8:
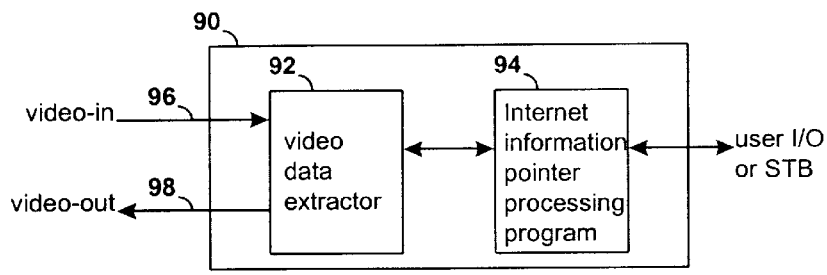
FIG. 8 is a block diagram of an Internet information pointer decoder apparatus of the present invention.

A generic Internet information pointer decoder apparatus according to the present invention is shown generally at 90 in FIG. 8. The decoder includes a video data extractor 92 and an Internet information pointer processing program 94. The video source from which the Internet information pointers are to be extracted is fed to a video-in port 96 of the video data extractor. The Internet information pointer processing program 94 employs the above-described Internet information pointer decoding method and coordinates with the video data extractor to extract Internet information pointers. The output video at a video-out port 98 of the video data extractor differs from the input video in that the former does not contain any Internet information pointer. All Internet information pointers are stripped off from the video signal by the video data extractor.

The Internet information pointer processing program contains and maintains an internal URL and text message table. The Internet information pointer processing program, which is preferably a program running on processing unit 24, is controllable through either a user input interface or some type of remote control device. The Internet information pointer processing program can also output its URL and text message table through a user output interface displayed on the TV or other display device. As mentioned earlier, depending on the video signal format and the way an Internet information pointer is being mapped onto a text-data transport portion of a video signal, there can be different embodiments of the generic Internet information pointer decoder. Special requirements for these different embodiments will be described below.

The following URL table entry assignment is recommended: entry number 0 is assigned to the default URL of the web browser software; entry numbers 1 to 7 are assigned to video program-related URLs; entry numbers 7 to 15 are assigned to TV channel-related URLs; and entry numbers greater than 16 are reserved and not used.

EXAMPLE 1

Internet information pointer encoder and decoder with UNICODE-encoded text message for NTSC video As a first example, implementation of the encoder and decoder of the present invention will be described for NTSC analog video format. The vertical blanking interval (VBI) on line 21 of field 1 is used for text-data transport with NTSC video. Additional details relating to video signal are described in Video Demystified, 1996, by Keith Jack, published by HighText Publications, which is incorporated herein by reference. Two closed-captioning channels (CC1 and CC2) and two text channels (T1 and T2) interleave their data on line 21 of field 1. Recently, the FCC approved the document EIA-608, September 1994, Recommended Practice for Line 21 Data Service, which is incorporated herein by reference, to set aside VBI on line 21 of field 2, also referred to as line 284, of the NTSC video signal for additional bandwidth for data. Two more closed-caption channels (CC3 and CC4), two more text channels (T3 and T4) and one new extended data services (XDS) channel can now interleave their data on line 21 of field 2, provided that their combined bandwidth does not exceed the maximum bandwidth of line 21 of field 2.

Specific requirements for an embodiment of the Internet information pointer encoder with a UNICODE encoded text message for NTSC video include the following:

(1) Assign the format codeword corresponding to UNICODE.

(2) Encode the text message with UNICODE, and thereby allowing any language supported by UNICODE to be used for text message.

(3) Use one of the closed-captioning and text channels for transporting the Internet information pointers. In principle, any of these captioning and text channels can serve to transport the Internet information pointer, but in practice, the closed-captioning channel CC3 is preferred so as to avoid potential conflict with the normal closed-captioning text in channel CC1.

(4) The following steps are used to map an Internet information pointer onto a closed-caption channel:

(a) Use the standard preamble control code for the caption text to lead each caption text row.

(b) Insert at most one Internet information pointer into a caption text row and align the beginning of the Internet information pointer with the beginning of a closed-caption text row.

(c) If an Internet information pointer is longer than 32 bytes, break it into 32-byte chunks with the last chuck containing 32 bytes or less. Place the chunks into consecutive caption text rows.

(d) Except for the preamble control code, do not use any other control codes defined for normal closed-caption text in the text row that transports an Internet information pointer or chunk.

Specific requirements for an embodiment of the Internet information pointer decoder with a UNICODE encoded text message for NTSC video are:

(1) Tune into the data channel, preferably CC3 as suggested above, that carries the Internet information pointers and execute the next_start_code( ) function in FIG. 6 to identify the beginning of a text row and to verify whether the leading two bytes of a caption text row are a valid start code.

(2) Proceed the Internet information pointer decoding method as outlined in FIG. 5.

(3) Interpret the data carried in consecutive caption text rows as in one long data row till the assumed CRC-byte position is encountered.

(4) Remove the Internet information pointer from the transport data channel and stuff the channel with NUL character as defined in the basic character set of the NTSC caption text.

The advantage of the above pair of embodiments of Internet information pointer encoder and decoder is that with one single format, namely, the UNICODE, the text message can be encoded with any language supported by the UNICODE. As a consequence, the same Internet information pointer encoder and decoder pair is internationally compatible without any modification.

EXAMPLE 2

Internet information pointer encoder and decoder with FCC-compliant Internet information pointer for NTSC video As mentioned above, using UNICODE for encoding text message of an Internet information pointer for NTSC video has the great advantage of being globally marketable. The downside of using UNICODE, however, is that this does not comply with the basic character set of NTSC caption text that was approved by the FCC. In fact, the basic character set for NTSC caption text comprises only a subset of the 128 ASCII codewords. Moreover, NTSC caption codewords are specifically designed so that every byte in the data channels of the NTSC video must be a legal 7-bit ASCII codeword with the most significant bit (MSB) of the byte being an odd-parity bit. In order to leverage existing NTSC closed-captioning encoding systems and decoding hardware, modifications to the generic Internet information pointer encoder and decoder are necessary. In particular, it is highly desirable that, for the Internet information pointer encoder and the decoder, the Internet information pointer can be transported in a data channel in a way that is compliant with the FCC regulations and recommendations on the usage of line 21 of field 1 and 2 of the NTSC video signal. With these considerations, an embodiment pair of Internet information pointer encoder and decoder that are FCC-compliant are as follows.

Specific requirements for an FCC-compliant embodiment of the Internet information pointer encoder for NTSC video are:

(1) Restrict all bytes of an Internet information pointer to be ASCII-compliant in both the Internet information pointer encoding and decoding methods by taking the following measures, referring to FIG. 2:

(a) The start code 0xfefe consists of two valid ASCII bytes and needs no change.

(b) The assigned format codeword corresponding to the ASCII character set should be a legal ASCII codeword.

(c) The valid bits of the command codeword are reduced to the seven least significant bits (LSB) and the parity bit is the MSB of the byte.

(d) The valid bits of the entry number codeword are reduced to the first seven LSBs and the parity bit is the MSB of the byte.

(e) The valid bits of the text message length reduce to the seven LSBs and the parity bit is the MSB of the byte.

(f) The text message is encoded with only the basic character set allowed for NTSC caption text.

(g) The valid bits of the URL length are reduced to the seven LSBs and the parity bit is the MSB of the byte.

(h) The URL is encoded with only the basic character set allowed for NTSC caption text.

(i) All 8 bits of the CRC remain valid, but the MSB is toggled when necessary for making the CRC codeword ASCII-compliant.

(2) Modify the functions of the Internet information pointer encoding method employed by the Internet information pointer encoder as follows:

(a) Before writing out any bit, the text_message_length(8) function computes the MSB of the text message length to be an odd-parity bit to the seven LSBs of the text message length. The value of the length of the text message in bytes is written out by the text_message_length(8) function as a 7-bit unsigned integer to the seven LSBs of the text message length.

(b) The text_message(text_message_length(8)) function encodes the text message with only the basic character set defined allowed for NTSC caption text.

(c) Before writing out any bit, the URL_length(8) function computes the MSB of the URL length to be an odd-parity bit to the seven LSB of the URL length. The value of the length of the URL in bytes is written out by the URL_length(8) function as a 7-bit unsigned integer to the seven LSB of the URL length.

(d) The URL(URL_length(8)) function encodes the URL with only the basic character set defined allowed for NTSC caption text.

(e) The CRC(8) function computes an 8-bit CRC codeword for the Internet information pointer body, and if the computed CRC codeword is not a legal ASCII codeword, the CRC(8) function toggles the MSB of the computed CRC codeword to make the computed CRC codeword ASCII-compliant.

(3) For the format codeword corresponding to the ASCII character set, assign the format codeword a legal ASCII codeword, e.g., 0×10.

(4) Use one of the NTSC data channels for transporting the Internet information pointers. The closed-captioning channel CC3 is preferred, as suggested before.

(5) For mapping an Internet information pointer onto a closed-caption channel, do the following:

(a) Use the standard preamble control code for the caption text to lead each caption text row.

(b) Insert at most one Internet information pointer into a caption text row and align the beginning of the Internet information pointer with the beginning of a closed-caption text row.

(c) If an Internet information pointer is longer than 32 bytes, break it into 32-byte chunks with the last chuck containing 32 or less bytes. Place these chunks into consecutive caption text rows.

(d) Except for the preamble control code, do not use any other control codes defined for normal closed-caption text in the text row that transports an Internet information pointer or chunk.

With the FCC-compliant embodiment of the Internet information pointer encoder for NTSC video, it is feasible to use any existing FCC-compliant closed-captioning authoring system to encode Internet information pointers into any of the NTSC data channels. Furthermore, the existing FCC-compliant closed-caption decoding hardware can also be used to extract Internet information pointers from any of the NTSC data channels. The closed-caption decoder software, however, has to be modified in order to decipher the content of an Internet information pointer.

Special requirements for an FCC-compliant embodiment of the Internet information pointer decoder are as follows:

(1) Modify the functions of the Internet information pointer decoding method as follows:

(a) The entry_number(8) decodes the seven LSB of the entry number codeword of an Internet information pointer to be the value of the entry number.

(b) The text_message_length(8) function decodes only the seven LSB of the field of the text message length of an Internet information pointer to be the value of the text message length.

(c) The URL_length function(8) decodes only the seven LSB of the field of the URL length of an Internet information pointer to be the value of the URL length.

(d) The computeCRC( ) function computes an 8-bit CRC codeword for the received Internet information pointer body and toggles the MSB of the computed CRC codeword if necessary to make the computed CRC codeword to be ASCII-compliant.

(2) Tune into the data channel, preferably CC3, that transports the Internet information pointers and execute the next_start_code( ) function to identify the beginning of a text row and to verify whether the leading two bytes of a caption text row are a valid start code.

(3) Proceed the Internet information pointer decoding method with the modifications described above in item 1.

(4) Interpret the data carried in consecutive caption text rows as in one long data row till the assumed CRC-byte position is encountered.

(5) Remove the Internet information pointer from the transported data channel and stuff the channel with NUL character as defined in the basic character set of the NTSC caption text.

Note that in the embodiment pair of Internet information pointer encoder and decoder with UNICODE-encoded text message, the text message of an Internet information pointer is encoded in UNICODE, while the URL of an Internet information pointer is encoded in ASCII. For the embodiment pair of Internet information pointer encoder and decoder with FCC-compliant Internet information pointer, both the text message and the URL of an Internet information pointer are encoded with the basic character set of the NTSC caption text. The EIA-608 specification also allows optional closed group extensions for encoding a limited number of two-byte-coded character sets, e.g., People's Republic of China character set (GB 2312) and Korean Standard character set (KSC 5601-1987). It is therefore possible to modify the embodiments of Internet information pointer encoder and decoder with FCC-compliant Internet information pointer to create a new pair of embodiments in which the text message of an Internet information pointer is encoded with one of those extension character sets specified in EIA-608 and the URL field of an Internet information pointer is still encoded with the basic character set of the NTSC caption text. For this new pair of embodiments of Internet information pointer encoder and decoder, one format codeword is assigned to each of the extension character sets specified in EIA-608.

EXAMPLE 3

Internet information pointer encoder and decoder for ATSC digital video

The Advanced Television System Committee (ATSC) of the United States has specified an ATSC Digital Television Standard (ATSC A/53, 1995, *ATSC Digital Television Standard*, incorporated herein by reference), in which an MPEG-2 (Motion Picture Experts Group) system stream is used to transport MPEG-2 video and AC-3 (Dolby Audio Compression-3) audio streams for every digital TV channel. Also specified in the ATSC A/54 standard (ATSC A/54, 1995, *Guide to the Use of the ATSC Digital Television Standard*, incorporated herein by reference) is the text-based ancillary services which include, among other things, the television program subtitles. The syntax and format of these subtitles are completely analogous to the NTSC/line-21 closed-caption. We can thus modify any aforementioned embodiment pair of Internet information pointer encoder and decoder for NTSC video for transporting Internet information pointers inside of ATSC digital TV signal.

Because ATSC A/54 specifies the use of the user-data portion of an MPEG-2 video elementary stream (see ISO/IEC IS 13838-2, International Standard, 1994, *MPEG-2 Video*, incorporated herein by reference) for transporting the program subtitles, i.e., closed-captioned text, the following special requirements for the embodiments of Internet information pointer encoder and decoder for ATSC digital video are derived:

(1) The video data inserter in FIG. 7 is required to:
   (a) Read in MPEG-2 system stream or MPEG-2 video elementary stream from its video-in port.
   (b) Insert an Internet information pointer inside the user-data portion of the MPEG-2 video elementary stream.
   (c) Output the resultant MPEG-2 system stream or video stream through its video-out port.
(2) The video data extractor in FIG. 8 is required to:
   (a) Read in MPEG-2 system stream from its video-in port.
   (b) Extract an Internet information pointer from the user-data portion of the MPEG-2 video elementary stream that is multiplexed inside the MPEG-2 system stream.
   (c) Forward the extracted Internet information pointer to the Internet information pointer processing program.
   (d) Removal of the Internet information pointer from the MPEG2 video elementary stream is not necessary since the MPEG-2 video decoder that does not recognize the Internet information pointer simply drops the bits related to an Internet information pointer silently.

Note that the mapping of NTSC caption text to the user-data portion of MPEG-2 video stream of ATSC digital TV signal has not been fully specified by ATSC. Once such a mapping is fully specified, the embodiments of Internet information pointer encoder and decoder for ATSC video can be implemented accordingly.

Another alternative of transporting Internet information pointers in ATSC digital TV signal is to use a separate private-user-data elementary stream to carry the Internet information pointers. A private-user-data elementary stream is independent of an MPEG-2 video elementary stream. At the system stream level, the private-user-data elementary stream, the MPEG-2 video elementary stream, and AC-3 audio elementary stream(s) are multiplexed together to form an MPEG-2 system stream. The advantage of using a private-user-data elementary stream is that the encoding and decoding of an Internet information pointer is accomplished independent of the MPEG-2 video encoder and decoder. As such, the existing MPEG-2 video encoder and decoder hardware are reusable without modification. The multiplexing and demultiplexing software at the MPEG-2 system stream level needs to be modified. It should be noted, however, that the use of private-user-data elementary stream within the scope of ATSC digital TV standard has not been specified. Once specified, the embodiments of Internet information pointer encoder and decoder can be implemented accordingly.

EXAMPLE 4

Internet information pointer encoder and decoder for PAL video

Closed-captioning is also supported by PAL video format. In Europe, the so-called PAL/line-22 captioning format, available mainly for home video applications, assigns VBI on lines 22 and 335 of PAL video for data transportation. Because the data format of the PAL/line-22 is the same as that of the NTSC closed-captioning, the aforementioned embodiments of Internet information pointer encoder and decoder for NTSC video are directly applicable to PAL/line-22, providing that the video data inserter in FIG. 7 and the video data extractor in FIG. 8 are PAL-capable of writing and reading PAL video.

A more general text data service, called the World Teletext System (WST), is also available for PAL video. WST has been used mainly for broadcast applications. In WST, teletext data is digitally encoded in the VBI on lines 17 through 20 of PAL video, and are broadcast alongside the normal video data. With more VBI lines assigned, WST offers a much higher data bandwidth than that available from PAL/line-22. In WST, different types of teletext services are transported by designated "pages" (ITU-R Recommendation BT.653-2:"System B, 625/50 television system", 1994, incorporated herein by reference). A WST-capable teletext decoder knows which page contains what data. By designating a teletext page for a new captioning data channel and transporting the Internet information pointers inside this new captioning data channel, the Internet information pointers can be encapsulated in the WST data services.

Special requirements for an embodiment of the Internet information pointer encoder for PAL video with WST data services include the following:

(1) Designate a particular WST page address for Internet information pointers and refer those WST pages with this designated page address as the WST-URL pages.
(2) Employ a generic Internet information pointer encoder as shown in FIG. 7.
(3) The video data inserter in FIG. 7 must be WST-capable.
(4) The Internet information pointer authoring unit in FIG. 7 employs the Internet information pointer encoding method in FIG. 4 with the following modifications:
   (a) Align the start of an Internet information pointer with the beginning of a WST-URL page.
   (b) Insert at most one Internet information pointer into a WST-URL page.
   (c) If an Internet information pointer is longer than the allowed maximum length of a WST-URL page, break the message into chunks according to this maximum length, and insert these chunks into consecutive WST-URL pages.
   (d) Assign the format codeword pertinent to UNICODE.
   (e) Encode the text message in UNICODE, thus allowing any language supported by the UNICODE to be used for text message.
   (f) Encode the URL in ASCII.

Preferably, the Internet information pointer authoring unit in FIG. 7 is implemented as an add-on software module to a general WST data authoring system and the video data inserter in FIG. 7 would then leverage the same WST encoding hardware.

Special requirements of an embodiment of a URL decoder for PAL video with WST data services include the following:

(1) Employ a generic Internet information pointer decoder as shown in FIG. 8.

(2) The video data extractor in FIG. 8 must be WST-capable.

(3) The Internet information pointer processing program in FIG. 8 employs the Internet information pointer decoding method in FIG. 5 with the following modifications:

(a) Tune into the WST page(s) that carries the Internet information pointers.

(b) The skipToNextInsertPoint( ) function in FIG. 6 skips to the beginning of the next WST-URL page.

(c) Proceed with the Internet information pointer decoding process as outlined in FIG. 5.

(d) Interpret the data carried in consecutive WST-URL pages as one long Internet information pointer till the assumed CRC-byte position is encountered.

Preferably, the Internet information pointer processing program in FIG. 8 is implemented as an add-on software module to a general WST data decoder system. The video data extractor in FIG. 8 could then leverage the same WST decoding hardware.

EXAMPLE 5

Internet information pointer encoder and decoder for DVB digital video

Recently, the European Telecommunications Standards Institute (ETSI) has approved a standard for Digital Video Broadcasting (DVB) systems (ETSI Draft ETR 154, 1994, "*Digital broadcasting systems for television; implementation guidelines for use of MPEG-2 systems; Video and audio in satellite and cable broadcasting applications*," incorporated herein by reference) in which it specifies that for each DVB broadcast video channel an MPEG-2 system stream (ISO/IEC IS 13818-1, International Standard, 1994, MPEG-2 Systems, incorporated herein by reference) is used for transporting MPEG-2 video, MPEG-2 audio, and data elementary streams. Also specified by ETSI is how to convert transparently the PAL teletext data into the private-data-stream-1 of the DVB bitstreams (ETSI Draft ETS 300 472, 1996, "*Digital broadcasting systems for television, sound, and data services; Specification for conveying ITU-R System B Teletext in Digital Video Broadcasting (DVB) bistreams*, incorporated herein by reference). According to the ETS 300 472 specification, any teletext services supported by the ITU-R BT.653-2 System B for 625/50 television systems can be mapped directly to the private-data-stream-1 of the DVB bitstreams. Thus, the embodiments of Internet information pointer encoder and decoder for PAL video with WST data services are applicable to DVB digital video with the following modifications:

(1) The video data inserter in FIG. 7 and the video data extractor in FIG. 8 are required to be DVB-capable for writing and reading DVB video.

(2) The Internet information pointer authoring unit, implemented as an add-on software module to a WST authoring system, encapsulates an Internet information pointer into one or more WST-URL pages and feeds these WST-URL page(s) to the video data inserter.

(3) The video data inserter in FIG. 7 now performs the following tasks:

(a) Convert a WST-Internet information pointer page, that is inputted from the Internet information pointer authoring unit, to MPEG PES (packetized elementary stream) packet(s) according to the specification ETS 300 472.

(b) Multiplex the original MPEG-2 system stream that is inputted from the video-in port with the MPEG PES packet(s) pertinent to a WST-URL page.

(c) Output the newly multiplexed MPEG-2 system stream through the video-out port.

(4) The video data extractor in FIG. 8 performs the following tasks:

(a) Demultiplex from the MPEG-2 system stream, which is fed from the video-in port, the MPEG PES packet(s) pertinent to a WST-URL page.

(b) Extract data from the pertinent PES packet(s) to form a WST-URL page and forward the WST-URL page to the Internet information pointer processing program.

(c) Removal of the WST-URL page from the MPEG-2 system stream is not necessary since such a page is part of the WST data services and is treated the same as other WST data.

(5) The Internet information pointer processing program in FIG. 8, implemented as an add-on software module to a DVB-capable WST data decoder system, recreates an Internet information pointer from the WST-URL page(s) forwarded by the video data extractor.

Add-On STB to Existing Web TV STBs

It is evident that the Internet access device of the present invention is superior to any of the existing web TV STBs as far as providing interaction between the web contents and the video contents is concerned. To leverage existing web TV STB hardware and software from different vendors, a device according to the present invention is described which can be used as an add-on to work with the existing web TV STBs. An add-on device according to the present invention is depicted at 100 in FIG. 9. This add-on device is similar in structure to device 10 described above. In particular, device 100 includes a TV tuner 102, a video decryption unit 104, a video data extractor 106, a video display processor 108, a processing unit 110, an IR receiver 112, a memory module 114, and a font repository 116.

Figure 9:
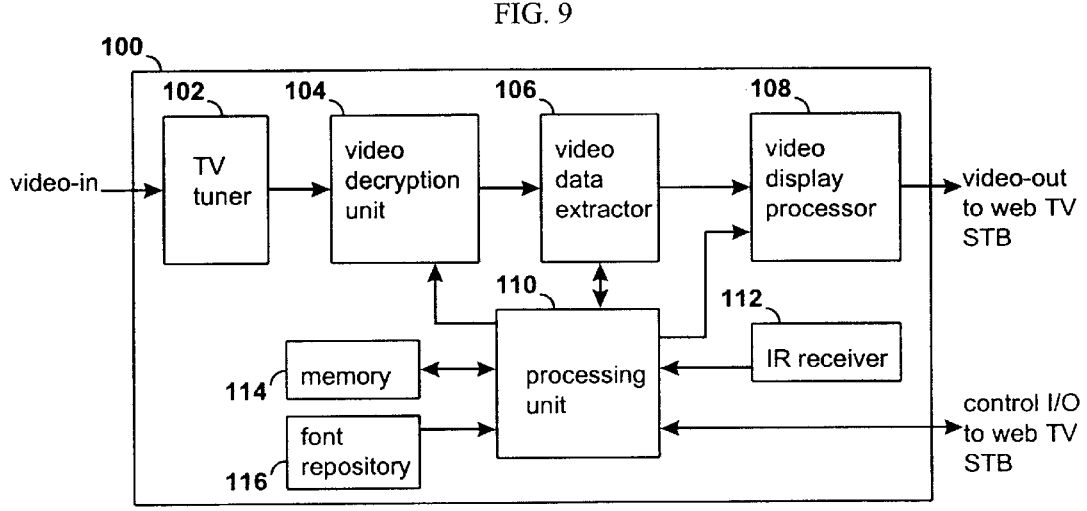
FIG. 9 is a block diagram of an embodiment of a TV-based Internet access device for use as an add-on STB to existing web TV STBs.

The add-on device in FIG. 9 differs from device 10 in FIG. 1 in the following ways.

(1) The add-on device does not have a modem and it outputs its video to an external web TV STB that has a modem.

(2) The processing unit of the add-on device does not have a web browser running on it. The web browser is running in the web TV STB that is external to this add-on device.

(3) The processing unit of the add-on device communicates to the external web TV STB via a control I/O port to exchange information such as URL and text message table, decryption keys, and so on.

(4) The Internet information pointer processing program runs on the processing unit.

(5) All the Internet connection activity is handled by the external web TV STB.

(6) The web browser running on the external web TV STB maintains the decryption key file (7) A decryption key is passed from the external web TV STB to the processing unit only when needed and then forwarded to the video decryption unit for decrypting video.

Viewing from a system level, the add-on device can be regarded as a pre-processing system to an external web TV STB. The main function of the external web TV is for fetching web contents. The interaction between the web contents and the video contents is handled by the add-on device with a minimal control information exchange to and from the external web TV STB. In the TV viewing mode, the content of the TV screen is determined by the video signal outputted from the video display processor (through the external web TV STB). A user can activate the displaying of text message menu and the selection of a text message in the same fashion as described above. But once a user selects a text message, the operating system running on the processing unit will forward the URL pertinent to the selected text message to the external web TV STB so that the operating system in the external web TV STB can initialize its web browser to go to this URL.

Applications

By transporting Internet information pointers along with a video signal, whole new kinds of applications are made possible. Consider, for instance, advertisement-related applications. Walt Disney™ can dub the URL of their on-line shopping store into their home video tapes or digital video disk. Every time a TV viewer watches the video tape or disk, he can display the text message menu on the TV screen and initialize a web browser in the device directly to an on-line shopping store by pressing a few buttons. The content creators of the TV commercial can format the URLs of their on-line stores into Internet information pointers and transport them with the TV commercial to solicit on-line shoppers. This can generate instant marketing response from the TV commercial viewers and also provides the viewers an instant access to interested web contents that are pertinent to the current commercial or TV program. TV news services organization can advertise the URLs of their web version news services along with their video program. On-line shopping TV channel would have no problem in finding the possible use of Internet information pointers for enhancing and expanding their business practices.

Using the present invention, TV content producers can make use of the Internet information pointers to obtain instant, on-line feedback from TV viewers by formatting a URL that is designed for user feedback into an Internet information pointer. The content producers can also create web contents related to their popular video programs, TV celebrities and stars, and format these URLs into Internet information pointers to be transported with their video program to enhance viewers' loyalty to their video program. This, of course, can be used in conjunction with on-line shopping and advertisement. TV game show producers can also use Internet information pointers to direct TV viewers to pertinent URLs to play on-line games through Internet connection.

With the present invention it is also possible to encode multiple Internet information pointers into a TV viewing guide channel. The pointers would direct the Internet access to the default URL of any one of the TV channels to facilitate obtaining of a decryption key which could be used to decrypt a pay-per-view movie or other video content. This application enhances the use of on-line TV program guide, without requiring a TV viewer to be Internet knowledgeable or English-speaking. This is significant because manual entry of a URL poses a tremendous barrier to non-English-speaking users. In another application, a public broadcast TV channel could transport along with its video program the Internet information pointers pertinent to local public services, such as library, police hot-line, community events, and so on.

With the present invention it is also possible to broadcast the TV guide channel completely in the format of HTML. That is, instead of broadcasting TV guide as video signal, the Internet information pointer encoder can be augmented to incorporate all of the information from a TV guide channel in HTML format. The Internet information pointer decoder is correspondingly modified to feed the HTML-based TV guide to the web browser. The web browser can then use the HTML-based TV guide to provide TV viewers a fully interactive experience of navigating through the TV guide via Internet connection. Thus, a user can access web sites related to upcoming shows and possibly view highlight video-clips or other information.

TV cable and satellite broadcast companies can broadcast such HTML-based TV guide inside their TV guide channel to their subscribers equipped with the device of the present invention. Likewise, the hotel industry can also use this embodiment of the present invention to offer their customers a web-based, interactive TV guide and customer service on TV.

It should be emphasized again that the video contents supported by the present invention are not limited to TV programs. The Internet information pointer encoding and decoding methods are equally applicable to VHS video tape, laser disc and digital video disk, as long as there is a text-data transport portion in the video signal. Consider for instance, the DVD (Digital Versatile Disc) video disk. (See DVD Alliance Group, 1996, Book B: DVD-Video, incorporated herein by reference.) DVD-video support a number of subtitles for a video channel. Internet information pointers can thus be dubbed into one of the subtitles of a DVD video channel and made available to a DVD decoder that is equipped with an appropriate Internet information pointer decoder for deciphering the Internet information pointers.

Likewise, the pointer need not have any particular form other than what is minimally necessary to at least identify an Internet site or resource with sufficient specificity to allow the device to determine where to look. Furthermore, although the discussion of the preferred embodiment of the present invention emphasizes the encoding of Internet information pointer in a video signal, it would also be possible to implement the present invention in the context of an audio signal as well. For instance, in an audio broadcast application, it is possible to has an MPEG system streams consisting of only multiple audio streams and a private data stream. Such an MPEG system stream can still be broadcast by MPEG-capable digital broadcasting system. The decoder of such an MPEG system stream can decode any audio stream to the sound system of a home entertainment theater. It is possible to encode the Internet information pointer in the private data stream of such an MPEG system stream so that when a listener of the audio signal wants to connect to a web site pertinent of the audio program, they can use the Internet access device of the present invention to initialize the browser to that web site automatically. The web site may provide the audio program guide of the date, or may permit the listener to select the next music to be broadcast or perhaps purchase a personal copy of the music.

It will now be clear that an improvement in this art has been provided which accomplishes the objectives set forth above. While the invention has been disclosed in its preferred form, it is to be understood that the specific embodiments which have been depicted and described are not to be considered in a limited sense because there may be other forms which should also be construed to come within the scope of the appended claims.

I claim:

1. A system for accessing the Internet based on an Internet information pointer encoded in a video signal, the system comprising:

a video display adapted to display a video portion of the video signal; and an Internet information device including a decoder adapted to extract the Internet information pointer encoded in the video signal, the access device being adapted to be connected to the Internet to access the Internet based on the extracted Internet information pointer, wherein the Internet information device further includes a video decryption unit adapted to decrypt a video signal using a decryption key obtained by accessing the Internet.

2. The system of claim 1, wherein the decryption key obtained by accessing the Internet includes a control field usable to control operation of the video decryption unit.

3. The system of claim 2, wherein multiple decryption keys are obtained by accessing the Internet and further including a processing unit configured to run a software application adapted to manage the use of the decryption keys to decrypt various video signals corresponding to the multiple decryption keys.

4. The system of claim 1, where the video signal is a viewing guide with multiple entries corresponding video content on other channels and, for at least some of the entries, a corresponding Internet information pointer is encoded in the video signal and that pointer is usable to obtain a decryption key for the entry to which the pointer corresponds.

5. A device for accessing the Internet based on an Internet information pointer encoded in a video signal, the device comprising:

a video signal input port;

an Internet access port;

a extractor connected to the video signal input and configured to recover the Internet information pointer encoded in the video signal;

a processor connected to the extractor to receive the recovered Internet information pointer therefrom, with the processor further being connected to the Internet access port to access the Internet utilizing the recovered Internet information pointer, further including a video signal output port and video decryption unit disposed between the video signal input port and the video signal output port and adapted to decrypt a video signal using a decryption key obtained by accessing the Internet utilizing the Internet information pointer.

\* \* \* \* \*